United States Patent
Ramachandran et al.

(10) Patent No.: US 8,990,743 B2
(45) Date of Patent: *Mar. 24, 2015

(54) AUTOMATED CIRCUIT DESIGN

(75) Inventors: Champaka Ramachandran, Cupertino, CA (US); Andrew Crews, Sunnyvale, CA (US); Kenneth S. McElvain, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,755

(22) Filed: Mar. 29, 2012

(65) Prior Publication Data

US 2012/0185811 A1 Jul. 19, 2012

Related U.S. Application Data

(63) Continuation of application No. 11/637,360, filed on Dec. 11, 2006, now Pat. No. 8,151,228, which is a continuation of application No. 10/850,808, filed on May 21, 2004, now Pat. No. 7,178,118.

(60) Provisional application No. 60/475,059, filed on May 30, 2003.

(51) Int. Cl.
*G06F 17/50* (2006.01)

(52) U.S. Cl.
CPC .......... *G06F 17/505* (2013.01); *G06F 17/5031* (2013.01); *G06F 17/5072* (2013.01); *G06F 2217/10* (2013.01); *G06F 2217/84* (2013.01)
USPC .......................................... 716/106; 716/111

(58) Field of Classification Search
CPC ..................... G06F 17/5022; G06F 17/5081
USPC ................. 716/100, 106, 108, 110–111, 114, 716/118–119, 126, 132, 134–135
See application file for complete search history.

(56) References Cited

U.S. PATENT DOCUMENTS 5,257,201 A * 10/1993 Berman et al. ................ 716/103
5,301,118 A * 4/1994 Heck et al. .................... 700/109

(Continued)

FOREIGN PATENT DOCUMENTS

JP 04-104374 4/1992
JP 06-180733 6/1994

(Continued)

OTHER PUBLICATIONS

Changfan, Chieh, et al., "Timing Optimization on Routed Designs with Incremental Placement and Routing Characterization," IEEE Transactions on Computer-Aided Design of Integrated Circuits & Systems, 19:2, pp. 188-196, Feb. 2000.

(Continued)

*Primary Examiner* — Stacy Whitmore
(74) *Attorney, Agent, or Firm* — HIPLegal LLP; Judith A. Szepesi

(57) ABSTRACT

Methods and apparatuses to automatically modify a circuit design (e.g., a synthesis solution) according to the sensitivity in design parameters with respect to the possible deviation in the subsequent implementation (e.g., placement and routing) of the circuit. In one aspect of the present invention, a method to design a circuit includes: determining likelihood of a design constraint being violated in an implementation of a first circuit design (e.g., a technology specific netlist with or without a placement solution); and, modifying the first circuit design to reduce the likelihood of the design constraint being violated. In one example, the implementation of the first circuit design includes a routing solution for implementing the first circuit design; and, the first circuit is modified through sizing an instance of a logic element, buffering a signal, load shielding for a signal, or other operations.

27 Claims, 6 Drawing Sheets

(56) References Cited

U.S. PATENT DOCUMENTS

| | | | |
|---|---|---|---|
| 5,381,524 A * | 1/1995 | Lewis et al. | 715/804 |
| 5,418,974 A * | 5/1995 | Craft et al. | 716/111 |
| 5,438,527 A * | 8/1995 | Feldbaumer et al. | 716/104 |
| 5,576,979 A * | 11/1996 | Lewis et al. | 716/102 |
| 5,583,788 A * | 12/1996 | Kuribayashi | 716/129 |
| 5,663,891 A * | 9/1997 | Bamji et al. | 716/122 |
| 5,666,290 A | 9/1997 | Li et al. | |
| 5,696,771 A | 12/1997 | Beausang et al. | |
| 5,787,008 A | 7/1998 | Pullela et al. | |
| 5,883,808 A | 3/1999 | Kawarabayashi | |
| 5,978,572 A | 11/1999 | Toyonaga et al. | |
| 5,999,714 A * | 12/1999 | Conn et al. | 716/115 |
| 6,009,248 A | 12/1999 | Sato et al. | |
| 6,038,382 A * | 3/2000 | Kanazawa | 716/122 |
| 6,453,451 B1 * | 9/2002 | Lakshmanan et al. | 716/102 |
| 6,463,567 B1 | 10/2002 | Kozai | |
| 6,532,577 B1 * | 3/2003 | Mbouombouo et al. | 716/103 |
| 6,543,036 B1 | 4/2003 | Iyer et al. | |
| 6,553,338 B1 | 4/2003 | Buch et al. | |
| 6,567,957 B1 * | 5/2003 | Chang et al. | 716/102 |
| 6,807,655 B1 | 10/2004 | Rehani et al. | |
| 6,826,733 B2 | 11/2004 | Hathaway et al. | |
| 7,017,043 B1 * | 3/2006 | Potkonjak | 713/176 |
| 7,251,800 B2 * | 7/2007 | McElvain et al. | 716/112 |
| 7,512,919 B2 | 3/2009 | Visweswariah | |
| 2001/0010090 A1 | 7/2001 | Boyle et al. | |
| 2002/0029370 A1 * | 3/2002 | Michalewicz et al. | 716/4 |
| 2002/0059553 A1 * | 5/2002 | Eng | 716/4 |
| 2003/0051217 A1 | 3/2003 | Cheng | |
| 2003/0237064 A1 | 12/2003 | White et al. | |
| 2004/0016842 A1 | 1/2004 | Couchey | |
| 2004/0236560 A1 * | 11/2004 | Chen | 703/18 |
| 2005/0278670 A1 * | 12/2005 | Brooks et al. | 716/5 |
| 2006/0101355 A1 | 5/2006 | Ciplickas et al. | |
| 2008/0216027 A1 | 9/2008 | White et al. | |
| 2009/0031261 A1 * | 1/2009 | Smith et al. | 716/2 |

FOREIGN PATENT DOCUMENTS

| | | |
|---|---|---|
| JP | 9198419 A | 7/1997 |
| JP | 09-232436 | 9/1997 |
| JP | 10-125790 | 5/1998 |
| JP | 2000-076321 | 3/2000 |
| JP | 2000-223578 | 8/2000 |
| JP | 2006-515054 | 5/2006 |

OTHER PUBLICATIONS

Christie, Phillip, et al., "Prelayout Interconnect Yield Prediction," IEEE Transactions on Very Large Scale Integration (VLSI) Systems, 11:1, pp. 55-59, Feb. 2003.

Coudert, Olivier, "Timing and Design Closure in Physical Design Flows," Proceedings of the International Symposium on Quality Electronic Design (ISQED '02), 6 pages, Mar. 18, 2002.

EP Patent Application No. 04753928.3, Office Action, Apr. 11, 2007, 7 pages.

EP Patent Application No. 10181410.1, European Search Report, Mar. 30, 2011, 11 pages.

EP Patent Application No. 10181410.1, Partial European Search Report, Dec. 16, 2010, 7 pages.

Hashimoto, Masanori, et al., "A Performance Optimization Method by Gate Resizing Based on Statistical Static Timing Analysis," IEIECE Trans. Fundamentals, vol. E83-A, No. 12, Dec. 2000, pp. 2558-2568.

JP Patent Application No. 2006-515054, Decision of Final Rejection, Sep. 7, 2010, 3 pages.

JP Patent Application No. 2006-515054, Notice of the Reason for Refusal, Jan. 26, 2010, 8 pages.

JP Patent Application No. 2006-515054, Notice of the Reason for Refusal, Jul. 28, 2009, 12 pages.

Kastner, Ryan, et al., "Predictable Routing," IEEE/ACM International Conference on Computer-Aided Design, pp. 110-113 (4 pages), Nov. 5, 2000.

Lee, Jin-Fuw, et al., "An Algorithm for Incremental Timing Analysis," Proceedings of the 32nd Annual ACM/IEEE Design Automation Conference ACM, 1995, pp. 696-701 (8 pages).

Orshansky, Michael, et al., "A General Probabilistic Framework for Worst Case Timing Analysis," Proceedings of $39^{th}$ Design Automation Conference, Jun. 10-14, 2002, XP002612426, IEEE Cat. No. 02CH37324, pp. 556-561.

PCT International Preliminary Report on Patentability, PCT/US2004/017207, 8 pages, date of issuance Dec. 1, 2005.

PCT International Preliminary Report on Patentability, PCT/US2004/016842, 7 pages, date of issuance Dec. 1, 2005.

PCT International Search Report and Written Opinion for PCT Application No. PCT/US2004/016842, 13 pages, mailed Dec. 13, 2004.

PCT International Search Report, PCT/US2004/017207, 14 pages, mailed Nov. 24, 2004.

Ren, Haoxing, et al., "Sensitivity Guided Net Weighting for Placement Driven Synthesis," ISPD '04, pp. 10-17, Apr. 18-21, 2004.

Japanese Patent Application No. 2011-002374 Office Action JPO's Mailing Date Jul. 31, 2012, 12 pages.

Extended European Search Report for EP Application No. 10181404.4 mailed Nov. 30, 2010, 6 pgs.

PCT International Preliminary Report on Patentability, PCT/US2004/016842, 8 pages, mailed Dec. 15, 2005.

PCT International Preliminary Report on Patentability, PCT/US2004/017207, 9 pages, mailed Dec. 15, 2005.

* cited by examiner

AUTOMATED CIRCUIT DESIGN

This application is a continuation of U.S. patent application Ser. No. 11/637,360, filed on Dec. 11, 2006, which is now U.S. Pat. No. 8,151,228, to issue on Apr. 3, 2012, which is a continuation of U.S. patent application Ser. No. 10/850,808, filed on May 21, 2004, now U.S. Pat. No. 7,178,118, issued on Feb. 13, 2007. This application also claims the benefit of the filing date of U.S. Provisional Application No. 60/475,059, filed May 30, 2003, and entitled "Method and Apparatus for Automated Circuit Design," which is incorporated herein by reference.

FIELD OF THE INVENTION

The invention relates to automated circuit design, and more particularly to the automated optimization of the design of a circuit before performing a detailed design layout.

BACKGROUND

For the design of digital circuits (e.g., on the scale of Very Large Scale Integration (VLSI) technology), designers often employ computer-aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning". A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and routing typically runs faster because as it has been reduced from one very large problem into a series of simpler problems.

After placement of components on the chip and routing of wires between components, timing analysis (e.g., timing simulation, or static timing analysis) can be performed to accurately determine the signal delays between logic elements. Back annotation can be performed to update a more-abstract design with information from later design stages. For example, back annotation reads wire delay information and placement information from the placement and route database to annotate the logic synthesis design. Back annotated delay information can be used to identify critical paths where the timing requirements are not satisfied; and logic synthesis may be improved to meet the timing requirements.

A typical software program for logic synthesis uses a delay estimator function based on the fanout of a net. Since all logic elements corresponding to a net with a certain fanout are assumed to have the same wire delay, the estimated delay information is not very accurate. In reality the wire delay depends on the length of the wire routed from one logic element to the next logic element. There is a higher correlation between placement distance and wire delay than between fanout and wire delay. Due to the error in the delay estimator in logic synthesis, a solution appears to be valid during logic synthesis may be found invalid after the placement and routing operation.

After the design layout (e.g., the placement and routing), only limited optimizations like resizing or buffering (known as in place optimizations) are typically performed. However, in place optimizations can provide only limited improvements. When the in place optimization cannot adjust the solution to meet the timing constraint, adjustment to the logic synthesis may be performed, leading to the expensive iteration between logic synthesis and placement and routing.

Synthesis and optimizations of logic circuits for reducing the delay of critical paths is an important step in designing and implementing a logic circuit. It is desirable to have accurate wire delay information to obtain optimization results of good qualities, since inaccurate delay estimation in the synthesis stage may lead to invalid design layout. If logic synthesis has to be improved to meet the timing requirement (e.g., slack requirement), expensive iterations between synthesis and design layout have to be performed. Note that slack is the difference between the desired delay and the actual (estimated or computed) delay. When the desired delay is larger than the actual delay, the slack is positive; otherwise, the slack is negative. Typically, it is necessary to make the slack positive (or close to zero) to meet the timing requirement (e.g., through reducing the wire delay to increase the slack). For example, during synthesis, a total negative slack algorithm (e.g., used in a circuit design compiler, Synplify, available from Synplicity, Inc., California) considers all instances whose slack is negative as candidates for improvement, since any one of the candidates with negative slack could become critical after physical design. It is typical to make the slack positive to ensure that the timing requirements are met.

SUMMARY OF THE DESCRIPTION

Methods and apparatuses to automatically modify a circuit design (e.g., a synthesis solution) according to the sensitivity in design parameters with respect to the possible deviation in the subsequent implementation (e.g., placement and routing) of the circuit are described here. Some embodiments of the present inventions are summarized in this section.

In one aspect of the present invention, a method to design a circuit includes: determining likelihood of a design constraint (e.g., a timing constraint, maximum capacitance, maximum transition, maximum crosstalk) being violated in an implementation of a first circuit design (e.g., a technology specific netlist with or without a placement solution); and, modifying the first circuit design to reduce the likelihood of the design constraint being violated. In one example, the implementation of the first circuit design includes a routing solution for implementing the first circuit design; and, the first circuit is modified through sizing an instance of a logic element, buffering a signal, load shielding for a signal, sizing a weakest driver of a logic element or other operations. In one example, the design constraint includes a timing constraint (e.g., worst negative slack of the circuit, a slack for an instance of a logic element in the first circuit design, a delay on a path in the first circuit design, a total negative slack of the circuit, or others). A total negative slack of a circuit is the sum of all negative slack at all endpoints of a circuit. An endpoint of a circuit is a point in the circuit where a path ends. In one example, modifying the first circuit design includes selecting an instance of a logic element for modification according to sensitivity of a parameter constrained by the design constraint to a parameter of the logic element due to uncertainty in an implementation of the first circuit design. In another example, modifying the first circuit design includes selecting a path for modification according to sensitivity of a parameter constrained by the design constraint to at least one parameter of logic elements on the path due to uncertainty in an implementation of the first circuit design. In one example, the likelihood of the design constraint being violated is determined from a possible change in estimated parameters (e.g., a net length, a net capacitance, a net resistance, a net topology) for a net connecting to an instance of a logic element in the first circuit design. In one example, after a number of candidates are determined from the instances of logic elements of the first circuit design based on sensitivity to uncertainty in an implementation of the first circuit design, a subset of the number of candidates is selectively modified (e.g., selecting one from the number of candidates according to flow that represents a number of paths passing through the candidate, and sizing up the selected one; or, performing a min-cut on a graph of the candidates, sizing up the ones on the cut). In one example, sizing up is performed only to an extent without degrading an overall design constraint (e.g., worst negative slack).

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary references to the same embodiment; and, such references means at least one.

At least one embodiment of the present invention seeks to optimize a circuit design (e.g., a synthesis solution of a technology specific design) so that the likelihood of design constraints being violated in an implementation of the circuit design is reduced (e.g., after placement and routing). In one embodiment, a minimum set of instances is selected for transformation to decrease the probability that they will be involved in the violation of the timing objective.

Many of the methods of the present invention may be performed with a digital processing system, such as a conventional, general-purpose computer system. Special purpose computers, which are designed or programmed to perform only one function, may also be used.

Figure 1:
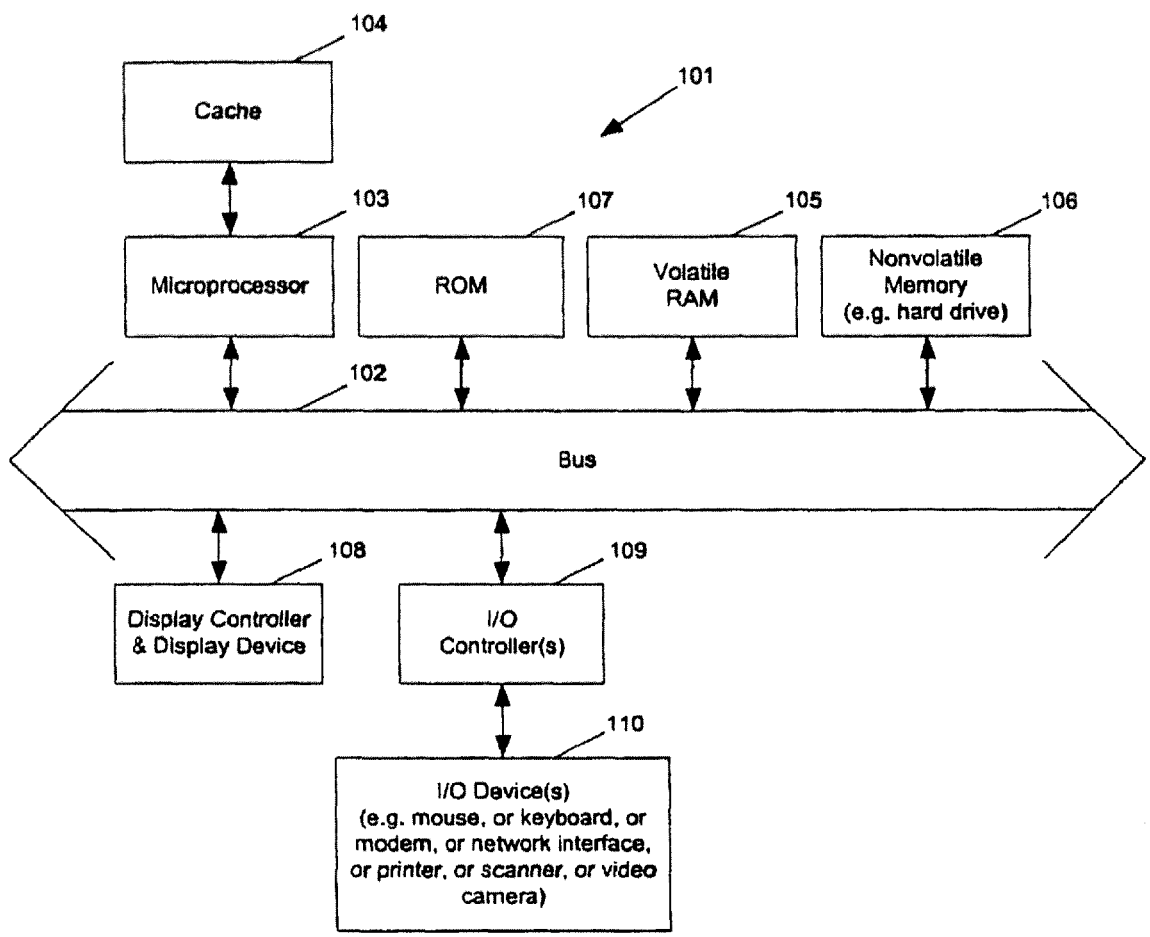
FIG. 1 shows a block diagram example of a data processing system, which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Sun workstation, or a personal computer (PC) running a Windows operating system, or an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In a typical circuit design process, a logic synthesis tool creates a logic element network that performs a given set of functions. The logic synthesis tool may transform and restructure the logic to optimize delays, areas and other design goals. The gate-level logic elements are mapped to vendor specific primitives to generate a technology specific netlist. The mapped technology specific netlist are then assigned to various blocks on the chip. A placement and routing tool then places the vendor specific primitives of the mapped netlist on the chip and routes the wires between the primitives. After the placement and routing, in place optimizations are typically performed to further optimize timing. In place optimizations make constrained changes to the logic elements without significantly changing the placement of the logic elements. After the placement and routing information is available, a detailed timing analysis can be performed to accurately determine if the timing constraints are all satisfied. If it is determined that the timing requirements are not all satisfied, the design produced by logic synthesis is changed to meet the timing requirements.

Thus, the accuracy of delay prediction of a synthesis tool for circuit design appears important for the generation of a good quality of results. Typically, a backend software program uses the design result of the synthesis tool for the detailed implementation of the circuit. For example, a placement and routing tool uses the design result of the synthesis tool for design layout. The delay on the critical path predicted by the synthesis tool, based on the synthesis estimated delay, should be in close fidelity with the timing objectives that are calculated based on the detailed data (e.g., parasitics data, detailed routing information) extracted from later stages of design (e.g., routing, layout and others). If the synthesis tool accurately predicts this backend delay prior to the handoff, the need to perform expensive iterations involving the synthesis tool and the backend software program can be avoided.

However, a synthesis tool may not always accurately predict this backend delay. Most timing objectives involve cell delays and net delays caused by the long wires. The long wire delays are typically handled in synthesis by buffering the long wires and hence effectively fracturing them into smaller wires. Thus, accurately predicting the delay of the cells can lead towards achieving a good prediction of the timing objective. The delay of a cell is typically a function of a capacitive load of a cell. The major components of a capacitive load include the capacitance of the net connected to the driver of the cell and the capacitive load of the load pins. The capacitance of the load pins can be deduced based on the logical connectivity of the design. However, the capacitance of the net can only be accurately obtained when the design layout is complete. Thus, the synthesis tool gets the onus of predicting the behavior of the backend software that eventually creates the design layout.

Rather than predicting the exact delay, the probability distribution of delay can be determined so that the probability of a portion of the circuit (e.g., a gate, or a path) involved in the violation of a timing objective can be evaluated. At least one embodiment of the present invention seeks to perform transformation on the portions of the circuit that have a higher probability in violating timing constraints to reduce the need for iterations involving the backend software program.

For example, sensitivity in the timing parameters with respect to a timing constraint due to possible deviations in the subsequent implementation (e.g., deviating from what is estimated by the embedded timing engine in the synthesis tool) is an indicator of the probability in violation in the subsequent implementation. A synthesis tool according to embodiments of the present invention performs transformations to ensure that the change in the timing objective is insignificant, in relation to the timing constraint, after performing the layout of the design. According to embodiments of the present invention, it is desirable that the possible deviation from delay estimation is small along critical paths and along near critical paths. Thus, the synthesis tool according to embodiments of the present invention identifies the possible post-layout critical and near critical portions of the circuit and performs transformations for these portions to reduce variation in the delay on critical paths and near critical paths, thus reducing the likelihood of getting a timing constraint violation when the design layout is implemented.

The timing objective and its uncertainty in estimation for the synthesis tool are primarily dependent on the net fanout, the drive strength of the instances, and other estimated factors such as wire load, and in physical synthesis, the route length, congestion effects and technology information such as resistance and capacitance per unit length of a wire. Congestion can affect both the coupling capacitance and the wire length (e.g., causing route detours).

For example, if there is a cell with a low drive strength driving a long net, even a small variation in the length of the net could have a large impact on the delay of the driving cell. Although one may completely eliminate all low drive strength cells and use only high drive strength cells, such an approach increases the area and loading penalty, which in turn adversely affects all the timing objectives. Thus, at least one embodiment of the present invention selectively chooses the cells for which the drive strength needs to be improved.

At least one embodiment of the present invention selectively performs design transformation on a subset of cells in the netlist of a circuit design. Various algorithms for identifying a reduced set (e.g., a minimal set) of instances for transformation are described below.

At least one embodiment of the present invention estimates the probability of timing constraint violation based on estimated physical data. For example, the probability of violation based on the sensitivity values is used to prioritize the improvement for instances so that ones which have a higher probability of violating after physical design are improved before those with a lower probability of violating. Thus, the candidate list may be minimized based on the probability of violation. Typically, a small set of the candidate list can be selected for improvement so that the area utilization after the improvement is smaller than improving all the instances with negative slack.

In one embodiment of the present invention, portions of the circuit are selected for design transformation, to reduce the probability of violating timing constraint in a later design stage of the design, based on the probability that the portions (e.g., an instance of a logic element, or a path in the circuit) may be involved in the violation of a timing objective. For example, the selection can be based on the probability of each gate involved in the violation of a timing objective (e.g., sensitivity to uncertainty due to the gate); or, the selection can be based on the probability of each path involved in the violation of a timing objective.

In one embodiment of the present invention, instances are examined one at a time to determine whether it will be involved in the violation of a timing objective. For example, a subset of instances can be selected for improving the drive strength; and, the size of the subset of instances is minimized through including only those whose sizing up will not cause degradation in the worst negative slack of the design and whose sizing up will also maintain the area utilization of the design within a predefined upper bound.

In one embodiment of the present invention, a subset of instances is selected according to the worst negative slack in the design. For example, portions of the circuits are selected for design transformation for the instances whose slack is worse than a threshold (e.g., between the threshold and the worst negative slack). The sensitivity of those instances to the change in the load can be determined, which is described in detail further below. If an increase in the load causes the slack of the instance to exceed that of the worst negative slack, the instance is selected on the list of candidates for size improvement.

In another embodiment of the present invention, a subset of instances whose slack is negative is selected. The sensitivity of all the instances in this subset is computed; and, the instances are prioritized for a design transformation based on a decreasing sensitivity value. In this scenario it is ensured that the total negative slack of the design is not degraded.

The change in the load can be estimated based on a perturbation of the wire load model when placement information for the instances is not available. In the case of physical synthesis, this change in the load on the instance can be determined based on more accurate physical information.

For example, when detailed placement is performed during physical synthesis, the legal locations of all instances in the design are available. A quick global route estimation can be performed to determine the most likely route that a net would assume. From these estimated routes, a predicted congestion map of the routes is determined.

Congestion can cause variation in the coupling capacitance of the wire. A net that gets routed through a region that is heavily congested is most likely to get detoured around the congested area, if the route resources are less than the demand of nets that need to get routed in that area. These types of nets are most likely to have an increase in net length.

Layer assignments of net after detailed routing can also cause unpredictable changes in resistance and capacitance of wires. Reducing the sensitivity of the instances in the congested area can reduced the effect of the unpredictable changes that may cause violations in timing requirements after the detailed routing.

In addition to the excess congestion of the area through which the net is routed, if there exists excess congestion in the neighboring areas, the amount of detour is likely to increase. Hence the possible length changes for these types of net can be further estimated accordingly.

In one embodiment, the increase in wire length can be estimated using a function that is dependent on the route congestion of the segments of the nets as well as the neighboring area route congestion. Typical global route estimates provide a lower bound on the actual length of the net. Thus, a factor based on experimental (or statistical) results that denotes the amount of (historical) perturbation of net length in excess of the lower bound length is added in one embodiment.

If the perturbation in the net length causes the slack of the instance to exceed the worst negative slack, the driving element of the net needs to be sized up until the effect of this perturbation does not contribute to a significant change in slack (e.g., causing the slack to be worse than a threshold value).

In one embodiment of the present invention, a possible change in net capacitance (ncc) is estimated according to the increase of net length because of a non-optimal route (el, the estimated length of the route), the fanout of the net (f), a congestion factor for a net segment (cg), a congestion factor for the neighborhood of the net segment (ncg), a congestion threshold (ct), and the height of a standard cell row (rt). For example, the possible change in the net capacitance (ncc) can be estimated as:

$$ncc = k_0 \times el \times f + k_1 \times rt \text{ when } cg \leq ct$$

$$ncc = k_2 \times cg + k_3 \times ncg \text{ when } cg > ct$$

where $k_0$, $k_1$, $k_2$ and $k_3$ are parameters derived based on statistical data. For example, after a number of synthesis solutions are placed and routed using a backend software tool, the actual changes in the net capacitance, between those estimated based on the synthesis solutions and those determined after the design layout, can be determined. The actual changes for these solutions can be correlated with the congestion factors to determine the parameters $k_0$, $k_1$, $k_2$ and $k_3$. Any curve fitting techniques can be used to derive parameters $k_0$, $k_1$, $k_2$ and $k_3$ based on the actual changes after the design layout for prior design solutions (e.g., based on a set of different circuits, a number of prior iterations for a given circuit, or others). It is understood that curve fitting techniques can also be used to determine the form of the formula for the estimation of the possible change in the net capacitance. Thus, expressions (or equations) that are different from the one illustrated above can also be used, which may require a different number of statistics based parameters.

Note that the change in net length can also be determined in a similar fashion. When the congestion factor may not be estimated (e.g., when the location information about the instances of the elements of the circuit is not available), the congestion factor can be set to a value smaller than the congestion threshold so that the estimated change in net capacity (or net length) is not based on the congestion factors.

A timing objective parameter (e.g., delay, slack, or other) is typically the function of the net capacitance. Thus, a change in the net capacitance can be used to determine the change in the timing objective parameter.

A sensitivity factor can be determined from: i) the timing objective parameter without considering the possible change ($t_{obj}$); and, ii) the timing objective parameter with the possible change ($t_{obj}^n$). Further, a threshold value for the timing objective parameter ($t_{obj}^t$) can be used in determining the sensitivity factor. For example, the threshold value can be the limit for the timing objective parameter, exceeding which results in a violation in a timing constraint. For example, a sensitivity factor (sf) can be evaluated as:

$$sf=(t_{obj}^n-t_{obj})/t_{obj}^t$$

Thus, the sensitivity factor increases as the change in the timing objective parameter increases with respect to a reference value (e.g., the threshold value) due to the possible change in the implementation.

It is understood that various alternative sensitivity factor definitions can be used to quantify the sensitivity and to indicate the probability of constraint violation in the subsequent implementation. For example, a formulation can be used to indicate a higher sensitivity for instances with a timing objective closer to the threshold, such as:

$$sf = \frac{(t_{obj}^n - t_{obj})^2}{t_{obj}^t \times (t_{obj}^t - t_{obj})}$$

In one embodiment, the sensitivity factor is used to select the portion of the circuit design for modification (or design transformation). For example, in an instance based approach, the sensitivities for the timing parameter due to individual instance elements are evaluated to determine the sensitive elements for modification; and, in a path based approach, the sensitivities for the timing parameter due to the instance elements on individual paths are evaluated to determine sensitive paths (and the sensitive elements on the paths) for modification. Further, a subset of sensitive elements can be selected from a sensitive path for modification.

Alternatively, the path sensitivity of an instance can be determined from performing a forward and backward breadth first traversal of all paths starting from the timing end points in the design. The set of timing end points includes the latches, registers, flip flops and I/O ports. For example, determining the path sensitivity $s^{path}$ includes:

a) calculating the instance sensitivity ($s^{instance}$) at every instance in the design;

b) performing a backward breadth first traversal to compute the backward path sensitivity ($s^{backward}$) at instance I that has drive instances $J_n$ (n=0, 1, . . . , N) such that:

$$s^{backward}(I)=s^{instance}(I)+\text{Max}(s^{backward}(J_0),s^{backward}(J_1),\ldots,s^{backward}(J_N));$$

c) similarly, performing a forward breadth first traversal to compute the forward path sensitivity ($s^{forward}$) at instance I that has load instances $J_m$ (m=0, 1, . . . , M) such that:

$$s^{forward}(I)=s^{instance}(I)+\text{Max}(s^{forward}(J_0),s^{forward}(J_1),\ldots,s^{forward}(J_M));\text{ and}$$

d) determining the path sensitivity for instance I from:

$$s^{path}(I)=\text{Max}(s^{forward}(I),s^{backward}(I)).$$

Note that a drive instance generates output as direct input to its load instances; and, a load instance receives input directly from its drive instances.

It is understood that there are many ways to define the sensitivity for an instance or a path. For example, a fully probability approach may be used to determine the probability and mean expectation of the change in the timing parameter, from which a sensitivity indicator is determined, although the evaluation of the probability and mean expectation may be computational intensive. Alternatively, sensitivity indicators can be evaluated based on deterministic changes, identified according to a number of factors, such as the change in net length due to a likely re-route to avoid a congested area. Further, statistics based parameters and deterministically determined parameters, such as congestion factors, can be combined to formulate empirical formula for the sensitivity factors. For example, during a synthesis, a net length may be determined from a wire load table according to fanout and block size of the net. It may be assumed that a certain percentage of change based on the looked up value is the possible change in the net length. Alternatively, the mean values of the changes in the net length can be developed with the wire load table, so that the possible change can also be looked up according to fanout and block size.

In a path based approach, the probability that a path delay could cause a violation in a timing objective is evaluated. For example, the timing objective for a path with many low drive cells is more likely to be violated than a path with only a few low drives. While it is difficult to exactly evaluate the probability of the violation in the timing objective, heuristic approaches can be used to determine indicators that indicate the probability of the violation in the timing objective. For example, deterministic changes for all net segments for a path can be identified and incorporated into the evaluation of the new timing objective for the path in determining the sensitivity in the path, in which the worst case scenario of all the changes being applied for the path in the backend tool is assumed.

To select a minimum set of instances that need to be transformed for the purpose of decreasing the probability of violation in timing objective (and to determine the order to apply the transformation), different selection schemes can be used. For example, the candidates can be selected based on the degree of sensitivity. For example, if a timing objective of an instance (e.g., a delay, or slack for a gate) is sensitive to the change in net length (or net capacitance) of a net, the driving element of the net is selected as a candidate for sizing up. Alternatively, the driving element of the net can be replicated, which effectively sizes up the driving element. After the driving element is replication, the load elements of the original driving element can be partitioned as the load elements of the original and the new driving element. Alternatively, both the original and the new driving elements can drive the load elements together. Similarly, if a timing objective of a path (e.g., a delay along a path) is sensitive to the change in net length (or net capacitance) of one or more nets on the path, the path is selected as a candidate for transformation. Further, the candidates can be selected according to the impact on the design goal. For example, the sensitive elements on the critical or near critical paths can be selected. Furthermore, the sensitive elements can be selected based on the relative importance or scope of influence in the circuit. For example, a sensitive element that is on more paths has a higher priority than a similar element is on less paths.

For example, after a pass of physical synthesis is performed, the legal locations of instances can be determined. Then, a candidate set of sensitive instances can be selected based on a sensitivity criterion. The candidates are sorted based on flow, the number of different paths flowing through each of the candidates. The candidates with larger flow are processed before the candidates with smaller flow are processed. Since sizing up one element may adversely affect other related timing parameters (e.g., the slack of an upstream element), a sizing-up operation is performed only to an extent that will not degrade these related timing parameters to an unacceptable level. Thus, for example, if it is determined that sizing up a candidate does not worsen a design goal (e.g., worst negative slack), the candidate is sized up (e.g., for a predetermined amount); otherwise, the candidate is sized up and buffered (optional) only to an extent that the design goal is not degraded. When a candidate cannot be sized up and buffered to sufficiently reduce the sensitivity (e.g., due to other design constraints), the weakest drive of the candidate is sized up so that it can drive a larger instance in one embodiment of the present invention.

When there are no sensitive instances present in the netlist that is handed off to the backend, one can be assured to a great extent that, even with some variation in the actual route topology, the timing constraints will not be violated (or will have a much smaller chance to be violated) due to the changes (e.g., deviations from the estimations in the synthesis stage) in the critical paths in the design.

In an alternative embodiment of the present invention, a graph is build to represent paths through the sensitive instances; and, a min-cut of the graph can be performed to select the instances for sizing up. A min-cut operation finds a set of minimum elements in a graph which separates the graph in two unconnected portion. Any known algorithms for performing the min-cut operation can be used. The set of sensitive elements on the min-cut represents a subset of minimum sensitive elements that have impact on the communication between two parts of the circuit. Thus, sizing up such a set of sensitive elements on a min-cut is a cost effective way to reduce sensitivity in the circuit design. After the instances in the cut are sized up (e.g., for a predetermined amount, or to an extent that will not worsen the worst negative slack), another min-cut operation can be performed. The min-cut based selection can be performed iteratively or in combination with other selection schemes. In one example, the graph represents the positioning of the sensitive instances on the paths passing through the signal paths; and, non-sensitive instances are not represented on the graph.

From this description, it will be apparent to one skilled in the art that various different selection and ordering schemes (e.g., as illustrated in the examples in this description, with different combinations and variations) can be used to effectively reduce the number of instances that need to be sized up and to increase the cost effectiveness of sizing up the instances.

Figure 2:
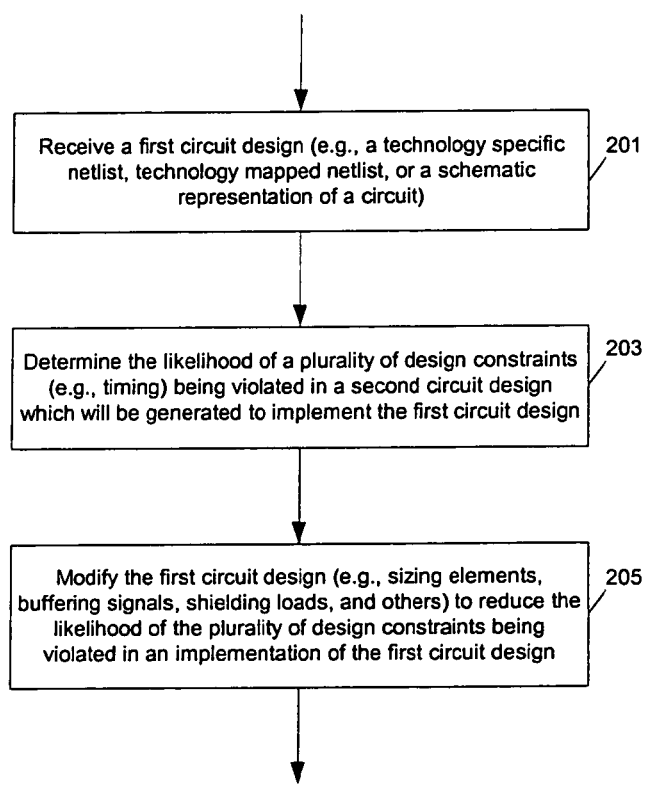
FIG. 2 shows a method to design a circuit according to one embodiment of the present invention.

FIG. 2 shows a method to design a circuit according to one embodiment of the present invention. After operation 201 receives a first circuit design (e.g., a technology specific netlist, technology mapped netlist, or a schematic representation of a circuit), operation 203 determines the likelihood of a plurality of design constraints (e.g., timing) being violated in a second circuit design which will be generated to implement the first circuit design. For example, the likelihood of the timing constraints being violated after the detailed design layout (e.g., after placement and routing) can be determined for a synthesis solution. Operation 205 modifies the first circuit design (e.g., sizing elements, buffering signals, shielding loads, and others) to reduce the likelihood of the plurality of design constraints being violated in an implementation of the first circuit design.

Figure 3:
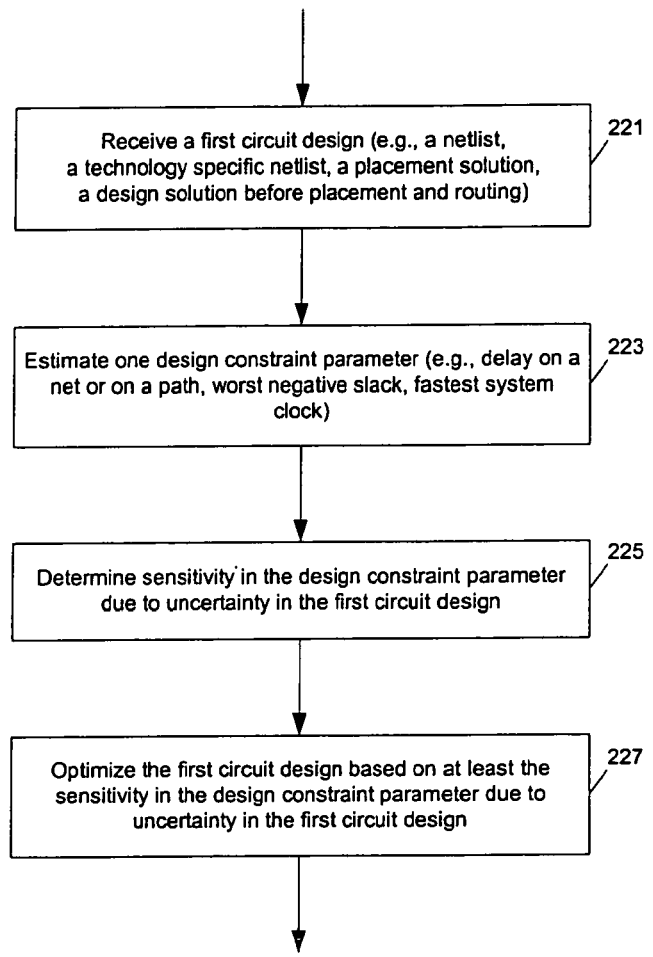
FIG. 3 shows a method to optimize a circuit according to one embodiment of the present invention.

FIG. 3 shows a method to optimize a circuit according to one embodiment of the present invention. After operation 221 receives a first circuit design (e.g., a netlist, a technology specific netlist, a placement solution, a design solution before placement and routing), operation 223 estimates one design constraint parameter (e.g., delay on a net or on a path, worst negative slack, fastest system clock) for the first circuit design. Operation 225 determines sensitivity in the design constraint parameter due to uncertainty in the first circuit design. For example, the changes in timing parameters due to a route determined in the routing software tool that is different from the route estimated by the synthesis tool (e.g., due to detour to avoid a congested area, or deviation from the estimation). Operation 227 optimizes the first circuit design based on at least the sensitivity in the design constraint parameter due to uncertainty in the first circuit design. The optimization can also be based on the cost effectiveness of the modifications, tolerated level of degradation in related design parameters, whether or not the sensitivity is critical, and others.

Figure 4:
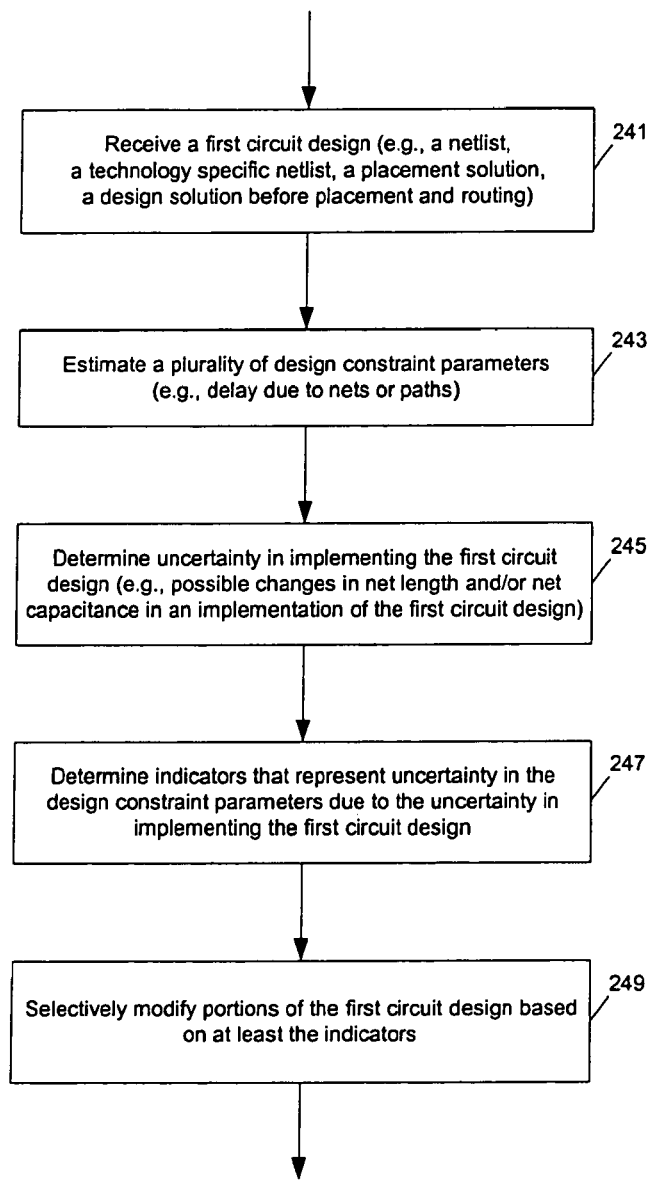
FIG. 4 shows a detailed method to optimize a circuit according to one embodiment of the present invention.

FIG. 4 shows a detailed method to optimize a circuit according to one embodiment of the present invention. After operation 241 receives a first circuit design (e.g., a netlist, a technology specific netlist, a placement solution, a design solution before placement and routing), operation 243 estimates a plurality of design constraint parameters (e.g., delay due to nets or paths). Operation 245 determines uncertainty in implementing the first circuit design (e.g., possible changes in net length and/or net capacitance in an implementation of the first circuit design). Operation 247 determines indicators (e.g., sensitivity factors) that represent uncertainty in the design constraint parameters due to the uncertainty in implementing the first circuit design. Operation 249 selectively modifies portions of the first circuit design based on at least the indicators.

Figure 5:
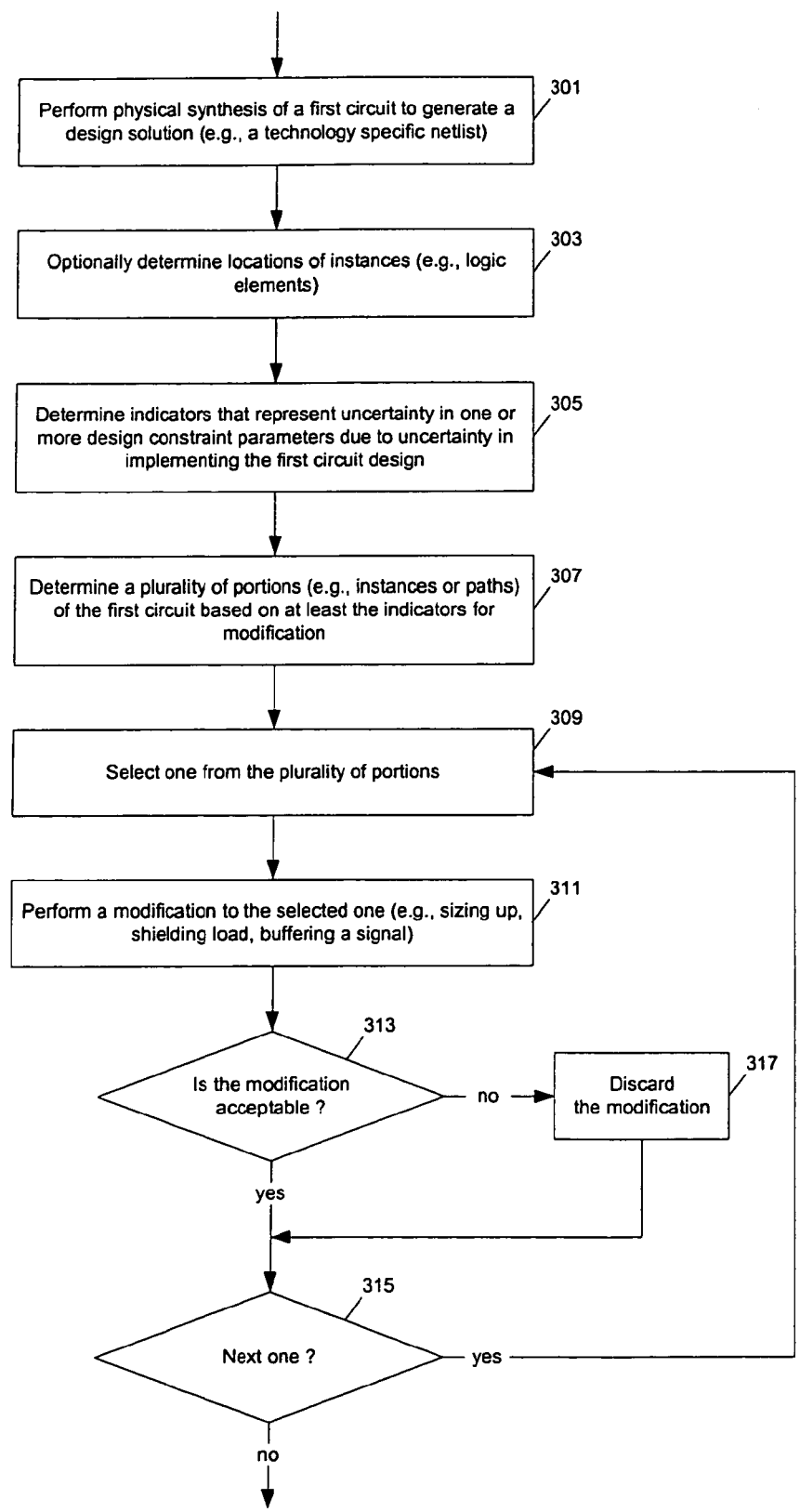
FIGS. 5-6 show detailed methods to selectively modify a circuit according to embodiments of the present invention.
Figure 6:
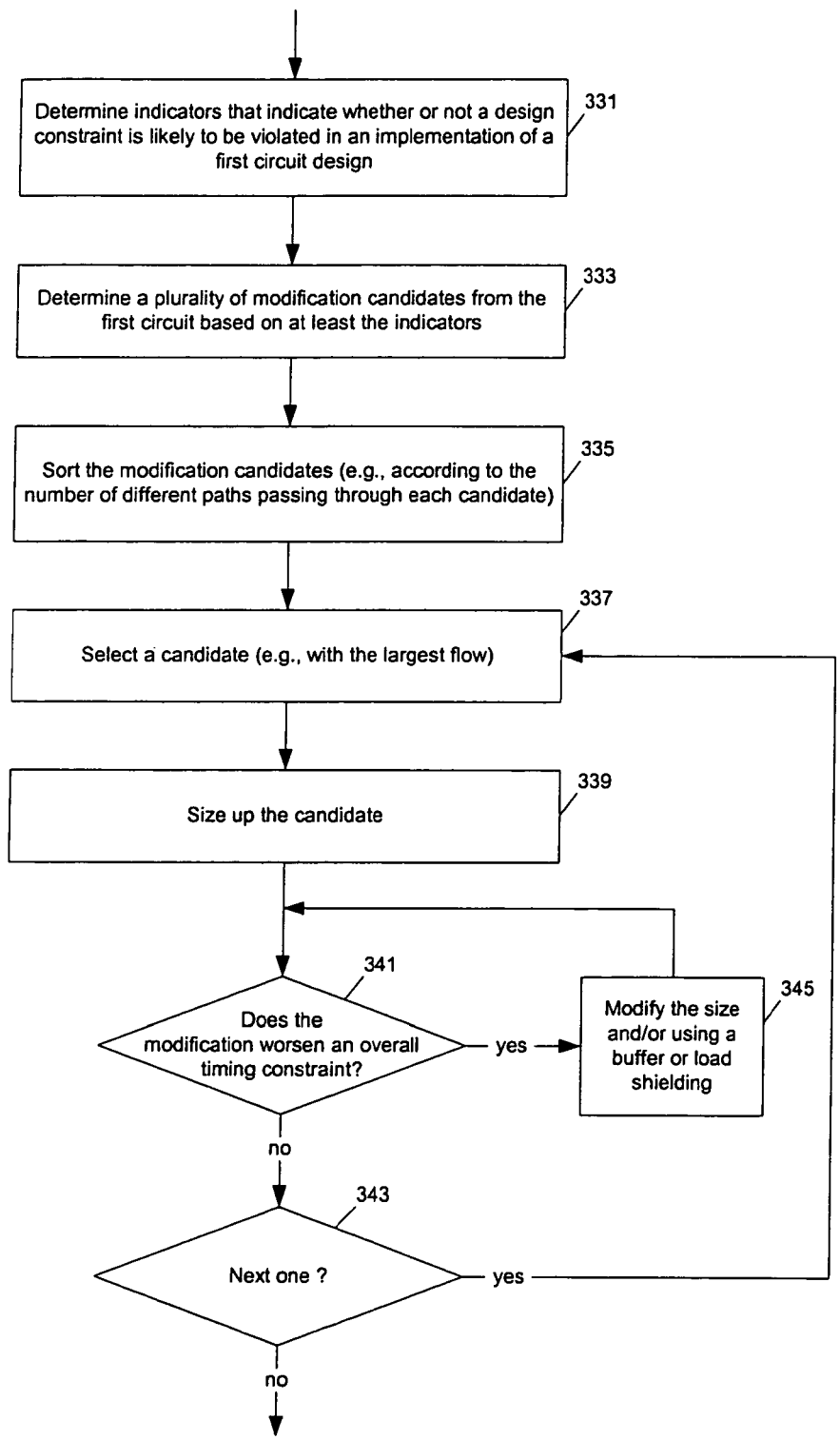

FIGS. 5-6 show detailed methods to selectively modify a circuit according to embodiments of the present invention.

In FIG. 5, operation 301 performs physical synthesis of a first circuit to generate a design solution (e.g., a technology specific netlist). Operation 303 optionally determines locations of instances (e.g., logic elements). Operation 305 determines indicators that represent uncertainty in one or more design constraint parameters due to uncertainty in implementing the first circuit design. Operation 307 determines a plurality of portions (e.g., instances or paths) of the first circuit based on at least the indicators for modification. Operation 309 selects one from the plurality of portions (e.g., selecting one instance with more flow, or selecting a set of sensitive elements on a min-cut, or selecting a sensitive instance from a sensitive path). In one embodiment, the selection is based on the indicators determined in operation 305. For example, the one with most sensitive indicator is selected for transformation first. Operation 311 performs a modification to the selected one (e.g., sizing up, shielding load, buffering a signal). If operation 313 determines that the modification is acceptable (e.g., the modification to the selected one does not degraded the worst negative slack), operation 315 proceeds to select the next one for modification; otherwise, operation 317 discards the modification to process another candidate.

In FIG. 6, operation 331 determines indicators that indicate whether or not a design constraint is likely to be violated in an implementation of a first circuit design. Operation 333 determines a plurality of modification candidates from the first circuit based on at least the indicators. Operation 335 sorts the modification candidates (e.g., according to the flow, the number of different paths passing through each candidate). Operation 337 selects a candidate (e.g., with the largest flow). Operation 339 sizes up the candidate. If operation 341 determines that the modification worsen an overall timing constraint, operation 345 modifies the size and/or using a buffer or load shielding (or apply other design transformation); otherwise, the next candidate is selected for sizing. In one embodiment, when the candidate cannot be sized up or buffered to reduce the sensitivity (or to sufficiently reduce the sensitivity), the weakest drive of the candidate is sized up.

In one embodiment of the present invention, the loop of selecting a candidate for modification (e.g., operations 315 to 309 in FIG. 5, or operations 343 to 337 in FIG. 6) continues until a maximum utilization limit is reached or the improvement in reducing the sensitivity is below a threshold value. For example, a maximum area usage constraint (or maximum increase of area usage) can be used to stop the iteration of selecting candidates for sizing up and/or for buffering. Further, when the sizing up and/or buffering of the candidates provides very limited improvement in sensitivity, the iteration can be terminated.

Although various examples of the present invention are illustrated with a timing constraint as a design constraint, from this description, it will be apparent to one skilled in the art that various methods of the present invention can also be used for selectively transforming portions of an early stage design (e.g., sensitive instances) to reduce the likelihood of other design constraints being violated in a late stage design that is based on the early stage design. Sensitivity analysis is performed to determine the sensitivity of the instances in design rule violations (such as maximum capacitance, maximum transition, and/or maximum crosstalk in the circuit). To reduce the likelihood of these design rules (or constraints) being violated, transformation (e.g., sizing) can be selectively performed based on the sensitivity of portions of the circuit (e.g., instances or paths).

While most embodiments of the present invention are intended for use in an HDL design synthesis software program, the invention is not necessarily limited to such use. Use of other languages and computer programs is possible. For example, a computer program may be written to describe hardware and thus be considered an expression in an HDL. Alternatively, the invention, in some embodiments, may allocate and reallocate a logic representation, e.g. a netlist, which was created without the use of an HDL. Embodiments of the present invention will be described in the context of, but not limited to, use in HDL synthesis systems, and particularly those designed for use with integrated circuits which have vendor-specific technology/architectures. As is well known, the target architecture is typically determined by a supplier of ICs. Embodiments of the present invention can be employed with application-specific integrated circuits (ASICs), including Structured ASICs and Platform ASICs, from vendors such as LSI Logic, NEC, IBM, Artisan Components Inc. Certain embodiments of the present invention can also be employed with programmable ICs. An example of a target architecture is the programmable lookup tables (LUTs) and associated logic of the integrated circuits which are field programmable gate arrays from Xilinx, Inc. of San Jose, Calif. Other examples of target architecture/technology include those well known architectures in field programmable gate arrays and complex programmable logic devices from vendors such as Altera, Lucent Technology, Advanced Micro Devices, and Lattice Semiconductor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to design a circuit, the method comprising:
   estimating one or more design constraint parameters for a first circuit design;
   determining one or more indicators that represent a probability of violation in the one or more design constraint parameters in a second circuit design, the second circuit design comprising a placement solution, a routing solution, or a combination thereof for the first circuit design; and
   modifying the first circuit design based on at least the one or more indicators to reduce the probability of violation in the one or more design constraint parameters in the second circuit design, wherein at least one of the estimating, determining, and modifying is performed by a processor.

2. A method as in claim 1, wherein the first circuit design comprises one of: a netlist, a placement solution, and a design solution before placement and routing.

3. A method as in claim 1, wherein the design constraint comprises a timing constraint.

4. A method as in claim 1, further comprising determining uncertainty in implementing the first circuit design, wherein the uncertainty in the one or more design constraint parameters is due to uncertainty in implementing the first circuit design.

5. A method as in claim 1, wherein the one or more indicators include one or more of a sensitivity to uncertainty in a logic element in an implementation of the first circuit design; sensitivity to uncertainty in a path in an implementation of the first circuit design; or a combination thereof.

6. A method as in claim 1, further comprising determining locations of instances.

7. A method as in claim 1, wherein the modifying includes selecting a portion of the first circuit design for modification from a plurality of portions of the first circuit design based on the at least one or more indicators; and performing modification to the selected portion.

8. A method as in claim 1, wherein the modifying comprises at least one of
   a) resizing an instance of a logic element;
   b) buffering a signal;
   c) load shielding for a signal; and
   d) replicating an instance of a logic element.

9. A method as in claim 1, wherein the modifying the first circuit design comprises
   determining a plurality of modification candidates based on the at least one or more indicators;
   selecting a candidate from the plurality of modification candidates; and
   performing modification to the selected candidate.

10. A method as in claim 1, wherein the determining comprises performing at least one of a forward breadth first traversal and a backward breadth first traversal of a path between timing end points in the first circuit design.

11. A method as in claim 1, wherein the determining comprises determining a possible change in one of:
   a) a net length;
   b) a net capacitance;
   c) a net resistance; and
   d) a net topology,
   for a net connecting to an instance of a logic element in the first circuit design.

12. A method as in claim 1, wherein the modifying comprises one of:
   selecting one from a number of candidates according to flow, the flow representing a number of paths passing through a candidate; and
   performing a min-cut on a graph with a number of candidates to determine a subset for modification.

13. A non-transitory machine readable medium containing executable computer program instructions which when executed by a digital processing system cause the system to perform operations comprising:
   estimating one or more design constraint parameters for a first circuit design;
   determining one or more indicators that represent a probability of violation in the one or more design constraint parameters in a second circuit design, the second circuit design comprising a placement solution, a routing solution, or a combination thereof for the first circuit design; and
   modifying the first circuit design based on at least the one or more indicators to reduce the probability of violation in the one or more design constraint parameters in the second circuit design.

14. A non-transitory machine readable medium as in claim 13, wherein the first circuit design comprises one of: a netlist, a placement solution, and a design solution before placement and routing.

15. A non-transitory machine readable medium as in claim 13, wherein the design constraint comprises a timing constraint.

16. A non-transitory machine readable medium as in claim 13, further comprising determining uncertainty in implementing the first circuit design, wherein the uncertainty in the one or more design constraint parameters is due to uncertainty in implementing the first circuit design.

17. A non-transitory machine readable medium as in claim 13, wherein the one or more indicators include a sensitivity to uncertainty in a logic element in an implementation of the first circuit design; sensitivity to uncertainty in a path in an implementation of the first circuit design; or a combination thereof.

18. A non-transitory machine readable medium as in claim 13, further comprising instructions that cause the system to perform operations comprising determining locations of instances.

19. A non-transitory machine readable medium as in claim 13, wherein the modifying includes selecting a portion of the first circuit design for modification from a plurality of portions of the first circuit design based on the at least one or more indicators; and
   performing modification to the selected portion.

20. A non-transitory machine readable medium as in claim 13, wherein the modifying comprises at least one of:
   a) sizing an instance of a logic element;
   b) buffering a signal;
   c) load shielding for a signal; and
   d) replicating an instance of a logic element.

21. A non-transitory machine readable medium as in claim 13, wherein the modifying the first circuit design comprises:
   determining a plurality of modification candidates based on the at least one or more indicators;
   selecting a candidate from the plurality of modification candidates; and
   performing modification to the selected candidate.

22. A non-transitory machine readable medium as in claim 13, wherein the determining comprises one of:
   performing at least one of a forward breadth first traversal and a backward breadth first traversal of a path between timing end points in the first circuit design; and
   determining a possible change in one of:
   a) a net length;
   b) a net capacitance;
   c) a net resistance; and
   d) a net topology,
   for a net connecting to an instance of a logic element in the first circuit design.

23. A non-transitory machine readable medium as in claim 13, wherein the modifying comprises one of:
   selecting one from a number of candidates according to flow, the flow representing a number of paths passing through a candidate; and
   performing a min-cut on a graph with a number of candidates to determine a subset for modification.

24. A data processing system to design a circuit, the data processing system comprising:
   a memory; and
   a processor coupled to the memory, the processor configured to estimate one or more design constraint parameters for a first circuit design;
   the processor to determine one or more indicators that represent a probability of violation in the one or more design constraint parameters in a second circuit design, the second circuit design comprising a placement solution, a routing solution, or a combination thereof for the first circuit design; and
   the processor to modify the first circuit design based on at least the one or more indicators to reduce the probability of violation in the one or more design constraint parameters in the second circuit design.

25. A data processing system as in claim 24, wherein the first circuit design comprises one of a netlist, a placement solution, or a design solution before placement and routing.

26. A data processing system as in claim 24, wherein the processor is further configured to
   determine uncertainty in implementing the first circuit design, wherein the uncertainty in the one or more design constraint parameters is due to uncertainty in implementing the first circuit design.

27. A data processing system as in claim 24, wherein the processor is further configured to determine locations of instances.

* * * * *